US012067948B2

(12) United States Patent
Kobayashi (10) Patent No.: US 12,067,948 B2
(45) Date of Patent: Aug. 20, 2024

(54) CIRCUIT DEVICE AND HEAD-UP DISPLAY APPARATUS

(71) Applicant: SEIKO EPSON CORPORATION, Tokyo (JP)

(72) Inventor: Daisuke Kobayashi, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/159,285

(22) Filed: Jan. 25, 2023

(65) Prior Publication Data

US 2023/0237968 A1 Jul. 27, 2023

(30) Foreign Application Priority Data

Jan. 26, 2022 (JP) ................................. 2022-010070

(51) Int. Cl.
*G09G 3/34* (2006.01)
*G02B 27/01* (2006.01)
(Continued)

(52) U.S. Cl.
CPC .......... *G09G 3/3406* (2013.01); *G02B 27/01* (2013.01); *G02B 27/0101* (2013.01);
(Continued)

(58) Field of Classification Search
CPC .............. G02B 27/01; G02B 27/0101; G02B 2027/011; G02B 2027/014;
(Continued)

(56) References Cited

U.S. PATENT DOCUMENTS

2016/0078800 A1\* 3/2016 Ha ........................ G09G 3/32
 315/209 R
2019/0266711 A1 8/2019 Anand et al.
(Continued)

FOREIGN PATENT DOCUMENTS

JP 2011-082108 A 4/2011
JP 2019-149760 A 9/2019
(Continued)

*Primary Examiner* — Nitin Patel
*Assistant Examiner* — Cory A Almeida
(74) *Attorney, Agent, or Firm* — Harness, Dickey & Pierce, P.L.C.

(57) ABSTRACT

A circuit device is used in a display device. The display device includes a display panel and a backlight including a plurality of light sources. The circuit device includes a distortion correction circuit, a failure information acquisition circuit, a position information acquisition circuit, and a host interface circuit. The distortion correction circuit executes distortion correction on input image data to output output image data after the distortion correction. The failure information acquisition circuit acquires failure information of the light sources. The position information acquisition circuit converts panel-side light source position information, which is position information of a faulty light source indicated by the failure information on the display panel, into input-side light source position information, which is position information of the faulty light source on the input image data. The host interface circuit outputs the input-side light source position information to a host.

7 Claims, 8 Drawing Sheets

(51) Int. Cl.
  *G09G 3/00* (2006.01)
  *G09G 3/20* (2006.01)
  *G09G 3/36* (2006.01)
(52) U.S. Cl.
  CPC ............ *G09G 3/001* (2013.01); *G09G 3/002* (2013.01); *G09G 3/006* (2013.01); *G09G 3/20* (2013.01); *G09G 3/34* (2013.01); *G09G 3/342* (2013.01); *G09G 3/3426* (2013.01); *G09G 3/36* (2013.01); *G02B 2027/011* (2013.01); *G02B 2027/014* (2013.01); *G02B 2207/113* (2013.01); *G09G 2330/12* (2013.01); *G09G 2340/04* (2013.01); *G09G 2380/10* (2013.01)
(58) Field of Classification Search
  CPC .... G02B 2027/113; G09G 3/006; G09G 3/20; G09G 3/34; G09G 3/3406; G09G 3/342; G09G 3/3426; G09G 3/36; G09G 2330/12; G09G 2340/04
  See application file for complete search history.

(56) References Cited

U.S. PATENT DOCUMENTS

| | | |
|---|---|---|
| 2020/0198468 A1 | 6/2020 | Anand et al. |
| 2021/0341995 A1* | 11/2021 | Wood ..................... B64D 47/08 |
| 2023/0237730 A1* | 7/2023 | Seiler ................... H04N 13/344 |
| | | 345/441 |

FOREIGN PATENT DOCUMENTS

| | | |
|---|---|---|
| JP | 2019-192499 A | 10/2019 |
| JP | 2020-100388 A | 7/2020 |

* cited by examiner

CIRCUIT DEVICE AND HEAD-UP DISPLAY APPARATUS

The present application is based on, and claims priority from JP Application Serial Number 2022-010070, filed Jan. 26, 2022, the disclosure of which is hereby incorporated by reference herein in its entirety.

BACKGROUND

1. Technical Field

The present disclosure relates to a circuit device, a head-up display apparatus, and the like.

2. Related Art

JP-A-2019-149760 discloses a circuit device including an image processing circuit and a comparison circuit. The image processing circuit executes first mapping processing of mapping an input first image to a second image to be projected onto a projection target, and second mapping processing of converting the second image into a third image by inverse mapping processing of the first mapping processing. The comparison circuit compares the first image with the third image, and outputs a result of the comparison as information for executing error detection of the second image. Further, JP-A-2019-149760 discloses that an external device of the circuit device, for example, a SoC or a CPU is notified of a result of the error detection.

When there is a defect in a backlight of the display device, visibility of a display image may decrease. Therefore, there is a problem that it is desired to notify the host of the defect in the backlight. In JP-A-2019-149760 described above, the SoC or the CPU is notified of the error of the image data, but it is neither disclosed nor suggested that the defect in the backlight is notified.

SUMMARY

An aspect of the present disclosure relates to a circuit device used in a display device that includes a display panel and a backlight including a plurality of light sources and in which each light source among the plurality of light sources is provided corresponding to a respective one of a plurality of areas of the display panel, the circuit device including: a distortion correction circuit configured to execute distortion correction on input image data to output output image data after the distortion correction; a failure information acquisition circuit configured to acquire failure information of the light sources; a position information acquisition circuit configured to convert panel-side light source position information, which is position information of a faulty light source indicated by the failure information on the display panel, into input-side light source position information, which is position information of the faulty light source on the input image data; and a host interface circuit configured to output the input-side light source position information to a host.

Another aspect of the present disclosure relates to a head-up display apparatus including: the circuit device described above; the display panel configured to display an image based on the output image data; the backlight; and a projection optical system configured to project the image displayed on the display panel.

DESCRIPTION OF EXEMPLARY EMBODIMENTS

Hereinafter, a preferred embodiment according to the present disclosure will be described in detail. The present embodiment to be described below does not unduly limit contents described in claims, and not all configurations described in the present embodiment are necessarily essential constituent elements.

1. Display Device

Figure 1:
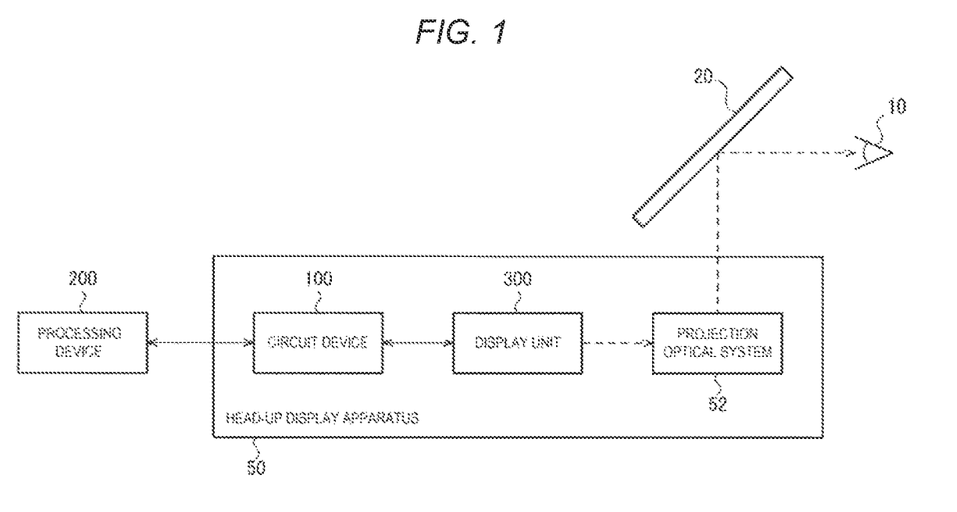
FIG. 1 shows a configuration example of a head-up display apparatus.

FIG. 1 shows a configuration example of a head-up display apparatus 50 as an example of a display device including a circuit device 100 according to the present embodiment. The head-up display apparatus 50 includes the circuit device 100, a display unit 300, and a projection optical system 52.

A processing device 200 transmits image data to the circuit device 100 of the head-up display apparatus 50. The processing device 200 is a so-called SoC, and is, for example, a processor such as a CPU or a microcomputer. The SoC is an abbreviation for a system on chip. The CPU is an abbreviation for a central processing unit.

The circuit device 100 executes distortion correction on image data received from the processing device 200, and transmits the image data after the distortion correction to the display unit 300. The distortion correction is image correction for performing HUD display with no or reduced distortion by applying, to an image, image distortion inverse to image distortion when an image displayed on a display panel is projected. The HUD is an abbreviation for head-up display. The image distortion due to projection includes image distortion due to a curved surface of a screen 20, image distortion due to the projection optical system 52, or both of these pieces of image distortion. The circuit device 100 is, for example, an integrated circuit device in which a plurality of circuit elements are integrated on a semiconductor substrate.

The display unit 300 includes a display panel and a backlight, and displays the image data after the distortion correction from the circuit device 100 on the display panel. The backlight emits light to the display panel. The projection optical system 52 includes a reflection plate and the like. The reflection plate reflects light transmitted through the display panel toward the screen 20, and the light reflected by the screen 20 is incident on eyes 10 of a user. Accordingly, a virtual image corresponding to an image displayed on the display panel is projected to a field of view of the user. The screen 20 transmits light from a real space that is a background of the HUD display. Accordingly, the virtual image obtained by the HUD appears to overlap the real space from the eyes 10 of the user. The screen 20 is, for example, a windscreen of a moving object on which the head-up display apparatus 50 is mounted.

2. Circuit Device and Display Unit

Figure 2:
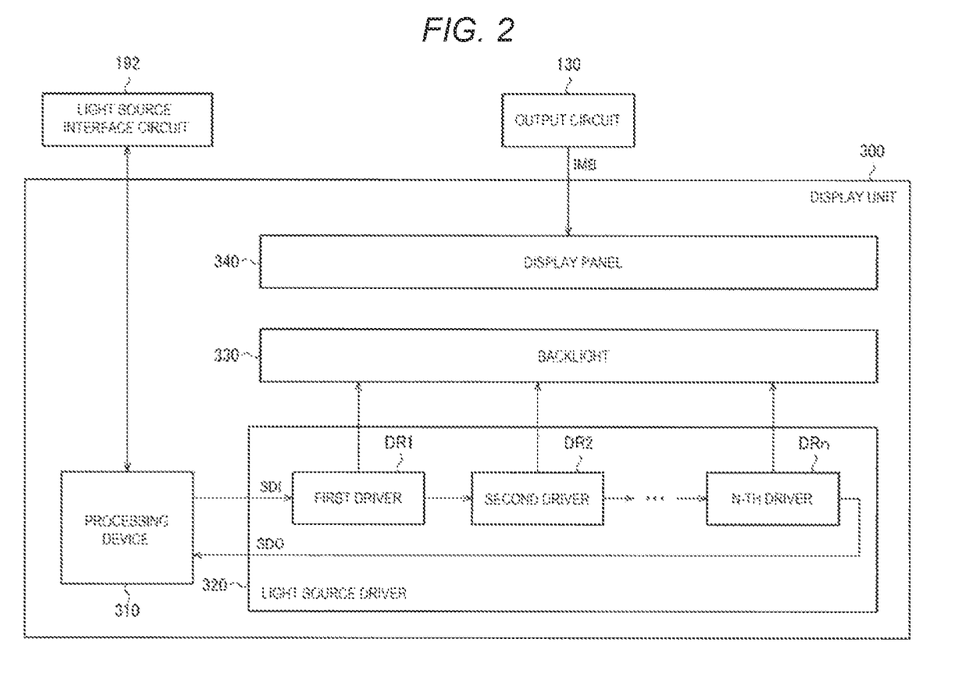
FIG. 2 shows a detailed configuration example of a display unit.

FIG. 2 shows a detailed configuration example of the display unit 300. The display unit 300 includes a processing device 310, a light source driver 320, a backlight 330, and a display panel 340.

The processing device 310 executes conversion between a communication format used by a light source interface circuit 192 of the circuit device 100 and a communication format used by the light source driver 320. The processing device 310 is, for example, a processor such as a CPU or a microcomputer. The processing device 310 may be omitted, and the light source interface circuit 192 and the light source driver 320 may directly communicate with each other.

The backlight 330 includes a plurality of light sources two-dimensionally arranged in a plan view. Each light source is, for example, a light emitting element such as an LED. The LED is an abbreviation for a light emitting diode. The backlight 330 overlaps the display panel 340 such that a side on which the plurality of light sources are disposed faces the display panel 340 in a plan view. Accordingly, emitted light from the plurality of two-dimensionally arranged light sources is incident on the display panel 340. The two-dimensional arrangement of the light sources is, for example, a matrix arrangement, but is not limited thereto, and may be, for example, a staggered arrangement. The staggered arrangement is, for example, an arrangement in which the light sources are disposed in odd-numbered columns in odd-numbered rows and the light sources are disposed in even-numbered columns in even-numbered rows.

The light source driver 320 drives the light sources of the backlight 330 based on light source control data from the light source interface circuit 192. Further, the light source driver 320 detects a failure of light sources of the backlight 330, and transmits failure information thereof to the light source interface circuit 192. The light source driver 320 includes a first driver DR1 to an n-th driver DRn. n is an integer of 1 or more. Each driver is implemented by, for example, an integrated circuit device.

Specifically, the first driver DR1 drives some light sources among the plurality of light sources of the backlight 330. The first driver DR1 independently turns on or off the light sources in charge. Further, the first driver DR1 causes the light sources in charge to emit light with a light amount set by the circuit device 100. The light amount can be independently set for each light source. The same applies to the second driver DR2 to the n-th driver DRn.

The first driver DR1 detects a failure of each light source in charge. The failure of the light source is a state in which the driver cannot control turning-on, turning-off, or the light amount of the light source. The failure of the light source is, for example, an open circuit and a short circuit of a light emitting element. The open circuit of the light emitting element is a state in which the light emitting element is turned off or cannot be controlled with a low light amount due to disconnection. The first driver DR1 detects the open circuit of the light emitting element by, for example, comparing an anode voltage of the light emitting element with an open circuit detection threshold voltage. The short circuit of the light emitting element is a state in which the light emitting element is turned on or cannot be controlled with a high light amount due to short circuit of a power supply and the like. The first driver DR1 detects the short circuit by, for example, comparing the anode voltage of the light emitting element with a short circuit detection threshold voltage.

The first driver DR1 to the n-th driver DRn are connected for cascade communication. That is, the first driver DR1 receives input data SDI such as the light source control data from the processing device 310, and transmits the input data SDI to the second driver DR2, which is repeated until the n-th driver DRn, so that the input data SDI is transmitted to the first driver DR1 to the n-th driver DRn. Further, the first driver DR1 transmits output data such as the failure information of the light source to the second driver DR2. The second driver DR2 adds transmission data of the second driver DR2 to transmission data from the first driver DR1 to transmit the added transmission data to the third driver DR3, which is repeated until the n-th driver DRn. The n-th driver DRn transmits output data SDO including output data of the first driver DR1 to the n-th driver DRn to the processing device 310. A communication connection method between the processing device 310 and the first driver DR1 to the n-th driver DRn is not limited to the above, and connection methods of various communication methods may be adopted.

The display panel 340 is, for example, a liquid crystal display panel. The liquid crystal display panel may be of a transmissive type or a reflective type. The display unit 300 includes a display controller and a display driver (not shown). The display driver outputs, to the display driver, output image data IMB from an output circuit 130 and a timing control signal for controlling a display timing. The display driver drives the display panel 340 based on the output image data IMB and the timing control signal, and causes the display panel 340 to display an image based on the output image data IMB. A function of the display controller may be incorporated in the circuit device 100.

Figure 3:
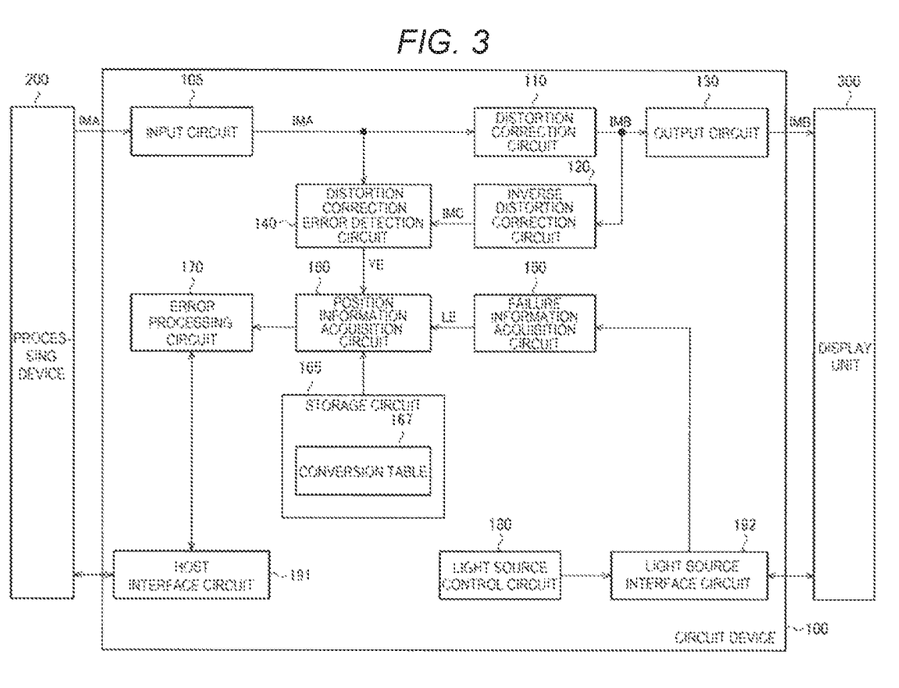
FIG. 3 shows a detailed configuration example of a circuit device.

FIG. 3 shows a detailed configuration example of the circuit device 100. The circuit device 100 includes an input circuit 105, a distortion correction circuit 110, an inverse distortion correction circuit 120, the output circuit 130, a distortion correction error detection circuit 140, a failure information acquisition circuit 150, a position information acquisition circuit 160, a storage circuit 165, an error processing circuit 170, a light source control circuit 180, a host interface circuit 191, and the light source interface circuit 192.

The input circuit 105 receives input image data IMA from the processing device 200. The input circuit 105 may be a reception circuit for various communication interfaces, and is, for example, a reception circuit for an LVDS, a DVI, a display port, a GMSL, a GVIF, or the like. The LVDS is an abbreviation for a low voltage differential signaling, the DVI is an abbreviation for a digital visual interface, the GMSL is an abbreviation for a gigabit multimedia serial link, and the GVIF is an abbreviation for a gigabit video interface.

The distortion correction circuit 110 executes the distortion correction on the input image data IMA using coordinate conversion between pixel coordinates of the input image data IMA and pixel coordinates of the output image data IMB, and outputs a result thereof as the output image data IMB. The distortion correction circuit 110 corresponds to a reverse warp engine or a forward warp engine. A reverse warp is warp processing of converting the pixel coordinates of the output image data IMB into reference coordinates corresponding to the pixel coordinates, and obtaining pixel data of the output image data IMB from pixel data of the input image data IMA at the reference coordinates. A forward warp is warp processing of converting the pixel coordinates of the input image data IMA into movement destination coordinates corresponding to the pixel coordinates, and obtaining pixel data of the output image data IMB at the movement destination coordinates from pixel data of the input image data IMA at the pixel coordinates. The coordinate conversion of the reverse warp and the forward warp is defined by a warp parameter. The warp parameter is a table in which the coordinates of the input image data IMA and the coordinates of the output image data IMB are associated with each other, a table showing a movement amount between the coordinates of the input image data IMA and the coordinates of the output image data IMB, a coefficient of a polynomial in which the coordinates of the input image data IMA and the coordinates of the output image data IMB are associated with each other, or the like.

The output circuit 130 transmits the output image data IMB to the display unit 300. The output circuit 130 may be a transmission circuit for various communication interfaces, and is, for example, a transmission circuit for the LVDS, the DVI, the display port, the GMSL, the GVIF, or the like.

The light source interface circuit 192 communicates with the light source driver 320 via the processing device 310 of the display unit 300. The light source interface circuit 192 may be various communication interfaces used for communication between circuit devices, and is, for example, SPI or I2C. The SPI is an abbreviation for a serial peripheral interface. The I2C is an abbreviation for an inter integrated circuit. The light source interface circuit 192 and the host interface circuit 191 are not limited to the separately provided interface circuits, and may be one common interface circuit.

The light source control circuit 180 transmits the light source control data to the light source driver 320 via the light source interface circuit 192 and the processing device 310. The light source control data is data for controlling turning-on, turning-off, or light amounts of the light sources of the backlight 330. The light source control circuit 180 may execute local dimming control for dimming the light sources based on, for example, a result obtained by image-analyzing the input image data IMA or the output image data IMB.

The failure information acquisition circuit 150 acquires failure information LE of each light source of the backlight 330 from the light source driver 320 via the processing device 310 and the light source interface circuit 192. The failure information includes information indicating a position of each light source of the backlight 330, and information indicating whether each light source is normal, is in an open circuit state, or is in a short circuit state. The information indicating the position of each light source of the backlight 330 is not limited to the information indicating the position itself, and may be information such as an index that can identify which light source a light source is.

The position information acquisition circuit 160 acquires input-side light source position information on the input image data IMA based on the failure information LE from the failure information acquisition circuit 150. The input-side light source position information is information indicating to which position on the input image data IMA a position of a failed light source corresponds. Specifically, the position information acquisition circuit 160 refers to a conversion table 167 stored in the storage circuit 165, and converts panel-side light source position information, which is position information of a faulty light source indicated by the failure information on the display panel 340, into the input-side light source position information, which is position information of the faulty light source on the input image data IMA. The position information is, for example, coordinates of an image corresponding to the light source, but is not limited thereto, and may be information of an area including the coordinates. The area may be indicated by coordinates of a vertex of a rectangle or the like, or may be indicated by coordinates of each pixel included in the area.

The conversion table 167 may be stored in the storage circuit 165 when manufacturing the head-up display apparatus 50, or may be written in the storage circuit 165 from the processing device 200 via the host interface circuit 191. The storage circuit 165 is a non-volatile memory such as an EEPROM or an OTP memory, or a volatile memory such as an SRAM. The EEPROM is an abbreviation for an electrically erasable programmable read only memory. The OTP is an abbreviation for one time programmable. The SRAM is an abbreviation for a static random access memory.

The inverse distortion correction circuit 120 generates inverse-distortion-corrected image data IMC by executing inverse distortion correction, which is inverse correction of the distortion correction executed by the distortion correction circuit 110, on the output image data IMB. The inverse distortion correction circuit 120 may be either one of a reverse map engine and a forward map engine. Further, the inverse distortion correction circuit 120 may use either one of warp processing using a table and warp processing using a polynomial.

The distortion correction error detection circuit 140 detects an error in the distortion correction by comparing the input image data IMA with the inverse-distortion-corrected image data IMC. The error in the distortion correction is a processing error generated in image processing executed by the distortion correction circuit 110 or the inverse distortion correction circuit 120. The distortion correction error detection circuit 140 detects an area in which the input image data IMA does not coincide with the inverse-distortion-corrected image data IMC, and outputs information for identifying the area as distortion correction error position information YE. The distortion correction error detection circuit 140 detects an area in which a coincidence degree is equal to or smaller than a predetermined value based on, for example, an SSD or an SAD of the input image data IMA and the inverse-distortion-corrected image data IMC. The SSD is an abbreviation for a sum of squared difference. The SAD is an abbreviation for a sum of absolute difference.

The host interface circuit 191 communicates with the processing device 200 that is a host of the circuit device 100. The host interface circuit 191 may be various communication interfaces used for communication between circuit devices, and is, for example, the SPI or the I2C. As described above, the light source interface circuit 192 and the host interface circuit 191 may be one common interface circuit.

The error processing circuit 170 executes error processing based on the input-side light source position information acquired by the position information acquisition circuit 160 based on the failure information LE of the light source and the distortion correction error position information YE. Specifically, the input-side light source position information and the distortion correction error position information YE are stored in the storage circuit 165, a register (not shown), or the like. When a failure of the light source, a distortion correction error, or both of the failure of the light source and the distortion correction error occur, the error processing circuit 170 transmits an interrupt signal to the processing device 200 via the host interface circuit 191. When receiving the interrupt signal, the processing device 200 reads the input-side light source position information and the distortion correction error position information YE from the storage circuit 165, the register (not shown), or the like via the host interface circuit 191.

The processing device 200 handles an error based on the input-side light source position information and the distortion correction error position information YE. For example, a display object in an area in which the failure of the light source or the distortion correction error occurs is moved to an area in which no failure of the light source and no distortion correction error occurs, and the input image data IMA after the movement is output to the circuit device 100. Alternatively, when the failure of the light source or the distortion correction error occurs, the processing device 200 may stop the output of the input image data IMA. Alternatively, when the failure of the light source or the distortion correction error occurs, the error processing circuit 170 of the circuit device 100 may stop the output of the output image data IMB from the output circuit 130.

The distortion correction circuit 110, the inverse distortion correction circuit 120, the distortion correction error detection circuit 140, the failure information acquisition circuit 150, the position information acquisition circuit 160, the error processing circuit 170, and the light source control circuit 180 are logic circuits. Each of these circuits may be implemented as an individual logic circuit, or may be implemented as a logic circuit integrated by automatic arrangement wiring or the like. Further, a part or all of these circuits may be implemented by a processor such as a DSP. The DSP is an abbreviation for a digital signal processor. In this case, a program or an instruction set in which a function of each circuit is described is stored in a memory, and the function of each circuit is implemented by a processor executing the program or the instruction set.

3. Detailed Example of Processing

Hereinafter, a detailed example of processing performed by the circuit device 100 will be described. Hereinafter, a case in which a plurality of light sources 332 of the backlight are disposed in a matrix will be described as an example.

Figure 4:
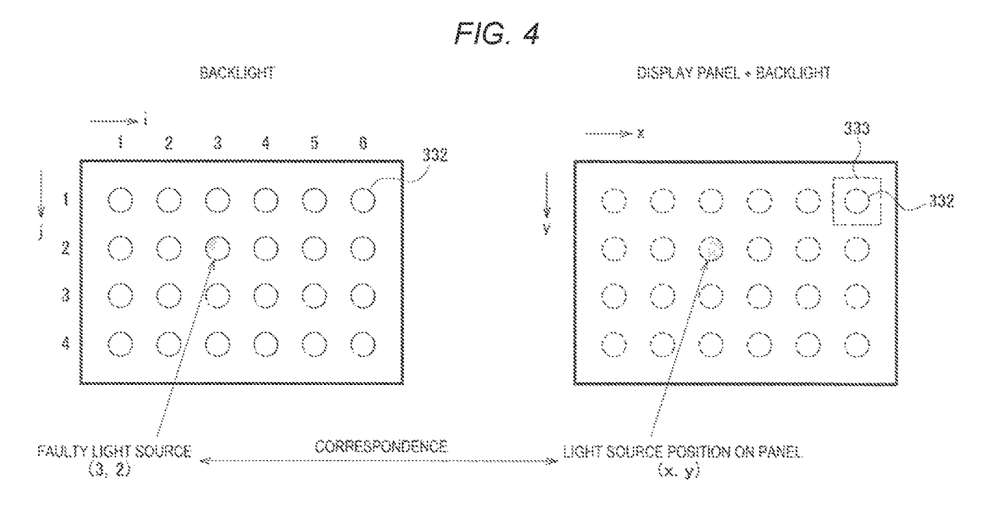
FIG. 4 is a diagram illustrating failure information and panel-side light source position information.

FIG. 4 is a diagram illustrating the failure information and the panel-side light source position information. As shown in a left figure, a column number of a light source matrix is set as i, a row number is set as j, and a light source position on the backlight is indicated by (i, j). i and j are integers of 1 or more. FIG. 4 shows an example in which a light source of (3, 2) is a faulty light source. The failure information acquired by the failure information acquisition circuit 150 includes the position (3, 2) of the faulty light source, and a flag indicating whether the faulty light source is in an open circuit state or a short circuit state. There may be 2 or more faulty light sources.

As shown in a right figure of FIG. 4, the backlight overlaps a back surface of the display panel in a plan view of the display panel. The light source 332 illuminates an area 333 on the display panel. A size of the area 333 may be fixed or may be changed according to a light amount of the light source 332. The right figure of FIG. 4 shows only one area 333, but there are areas corresponding to the light sources 332.

Pixel coordinates of the display panel are indicated by (x, y). x indicates a coordinate in a horizontal scanning direction, and y indicates a coordinate in a perpendicular scanning direction. It is assumed that the horizontal scanning direction is parallel to a row of the light source matrix. At this time, the light source position (i, j) on the backlight corresponds to the pixel coordinates (x, y) on the display panel in a plan view. Based on the correspondence, the position information acquisition circuit 160 converts the position (3, 2) of the faulty light source into the panel-side light source position information. The panel-side light source position information indicates, for example, pixel coordinates corresponding to a center point of the light source, pixel coordinates corresponding to vertexes of a rectangular area illuminated by the light source, coordinates of each pixel included in the area illuminated by the light source, or the like.

Figure 5:
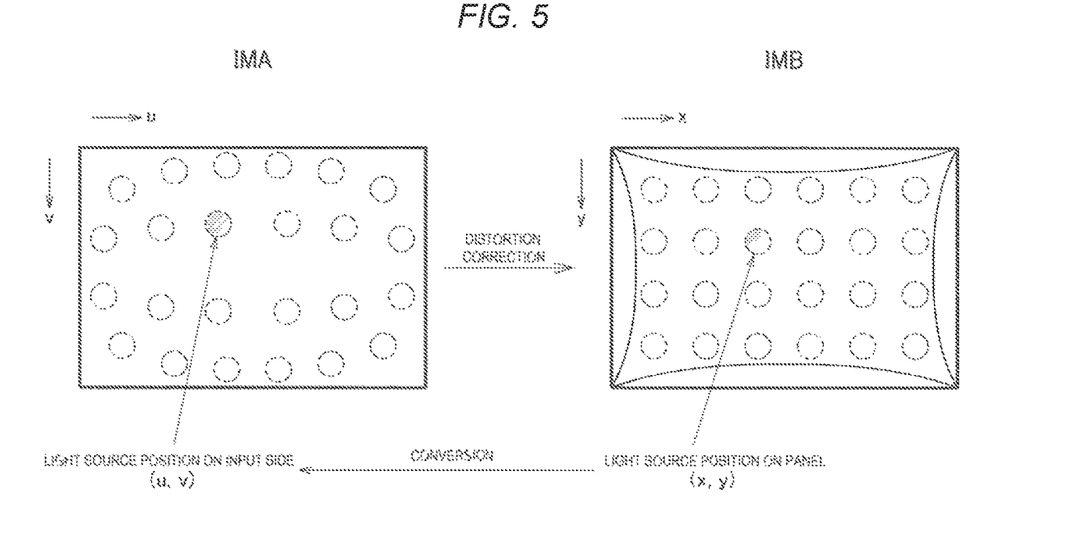
FIG. 5 is a diagram illustrating the panel-side light source position information and input-side light source position information.

FIG. 5 is a diagram illustrating the panel-side light source position information and the input-side light source position information. As shown in a left figure, the pixel coordinates of the input image data IMA are indicated by (u, v). u is a coordinate in a horizontal scanning direction, and v is a coordinate in a perpendicular scanning direction. As shown in a right figure, the pixel coordinates of the output image data IMB are indicated by (x, y). The distortion correction circuit 110 executes coordinate conversion between the coordinates (u, v) of the input image data IMA and the coordinates (x, y) of the output image data IMB, and maps the input image data IMA to the output image data IMB based on a result of the coordinate conversion.

The position information acquisition circuit 160 converts panel-side light source position information of the faulty light source into input-side light source position information based on a correspondence relationship between the coordinates (u, v) of the input image data IMA in the distortion correction and the coordinates (x, y) of the output image data IMB. For example, the conversion table 167 indicating a correspondence between (x, y) and (u, v) is created in advance based on the warp parameter of the distortion correction, and is stored in the storage circuit 165. The position information acquisition circuit 160 maps the coordinates (x, y) of the faulty light source on the display panel to the coordinates (u, v) of the input image data IMA using the conversion table 167.

FIG. 5 shows an example in which center coordinates of the light source are set as light source position information. That is, coordinates of an intersection between a line that passes through a center of the faulty light source and that is orthogonal to the display panel and the display panel are set as center coordinates (x, y) of the faulty light source on the display panel. The position information acquisition circuit 160 converts the center coordinates (x, y) of the faulty light source on the display panel into the coordinates (u, v) of the input image data IMA. The coordinates (u, v) serve as the input-side light source position information.

In the present embodiment described above, the circuit device 100 is used in the display device. The display device includes the display panel 340 and the backlight 330 including the plurality of light sources. Each light source 332 among the plurality of light sources is provided corresponding to each area 333 among the plurality of areas of the display panel 340. The circuit device 100 includes the distortion correction circuit 110, the failure information acquisition circuit 150, the position information acquisition circuit 160, and the host interface circuit 191. The distortion correction circuit 110 executes the distortion correction on the input image data IMA to output the output image data IMB after the distortion correction. The failure information acquisition circuit 150 acquires the failure information LE of each light source 332. The position information acquisition circuit 160 converts the panel-side light source position information, which is position information of the faulty light source indicated by the failure information LE on the display panel 340, into the input-side light source position information, which is position information of the faulty light source on the input image data IMA. The host interface circuit 191 outputs the input-side light source position information to the host.

According to the present embodiment, it is possible to notify the host of a defect in the backlight 330. When the distortion correction is executed, it is necessary to notify the host of the position information of the faulty light source of the input image data IMA in consideration of mapping. According to the present embodiment, the panel-side light source position information, which is position information of the faulty light source on the display panel 340 is converted into the input-side light source position information, which is position information of the faulty light source on the input image data IMA. Accordingly, it is possible to notify the host of the position information of the faulty light source in consideration of the mapping in the distortion correction. The host can execute processing of handling the light source failure on the input image data IMA based on the position information.

In the examples in FIGS. 1 and 3, the host corresponds to the processing device 200. In the example in FIG. 5, the input-side light source position information indicates the center coordinates of the faulty light source. However, as described later in FIG. 6 or 7, the input-side light source position information is not limited to the center coordinates of the faulty light source.

In the present embodiment, the circuit device 100 includes the light source interface circuit 192. The light source interface circuit 192 performs interface processing with the light source driver 320 that drives the plurality of light sources. The failure information acquisition circuit 150 acquires the failure information LE via the light source interface circuit 192.

According to the present embodiment, the failure information acquisition circuit 150 can acquire the failure information LE of each light source detected by the light source driver 320 via the light source interface circuit 192. The position information acquisition circuit 160 can acquire the input-side light source position information of the faulty light source based on the failure information LE.

In the present embodiment, the position coordinates (x, y) of the faulty light source on the display panel 340 are input as the panel-side light source position information to the position information acquisition circuit 160. The position information acquisition circuit 160 executes the inverse distortion correction of the distortion correction on the position coordinates (x, y) to obtain the input-side light source position information.

According to the present embodiment, the position coordinates (x, y) of the faulty light source on the display panel 340 are converted into position coordinates (u, v) of the input image data IMA by the inverse distortion correction. Accordingly, the position coordinates (u, v) of the faulty light source of the input image data IMA are output as the input-side light source position information to the host.

In the example in FIG. 5, the position coordinates (x, y) of the faulty light source on the display panel 340 are the center coordinates of the faulty light source. However, the position coordinates do not necessarily need to be the center coordinates of the faulty light source. For example, when the faulty light source does not fail, the position coordinates may be position coordinates of a point having highest luminance in a luminance distribution on the display panel illuminated by the light source. In the example in FIG. 3, the inverse distortion correction for the position coordinates corresponds to the coordinate conversion using the conversion table 167. However, the inverse distortion correction for the position coordinates may be coordinate conversion using any method as long as the position coordinates (x, y) on the display panel 340 can be converted into the position coordinates (u, v) of the input image data IMA.

In the present embodiment, the circuit device 100 includes the storage circuit 165. The storage circuit 165 stores the conversion table 167 in which the position information of each light source 332 on the display panel 340 is associated with the position information on the input image data IMA. The position information acquisition circuit 160 converts the panel-side light source position information into the input-side light source position information based on the conversion table 167.

According to the present embodiment, the position information of the light sources on the display panel being associated with the position information on the input image data is stored in the storage circuit 165 as the conversion table 167 in advance, and the position information of the faulty light source on the display panel can be converted into the position information of the faulty light source on the input image data using the conversion table 167.

In the present embodiment, the failure information acquisition circuit 150 acquires, as the failure information, at least one of the open circuit information and the short circuit information of the light emitting element of each light source 332.

According to the present embodiment, the input-side light source position information of the faulty light source, and information indicating whether a failure of the faulty light source is an open circuit or a short circuit of the light emitting element are transmitted to the host. Accordingly, the host can execute handling according to a type of the failure.

Figure 6:
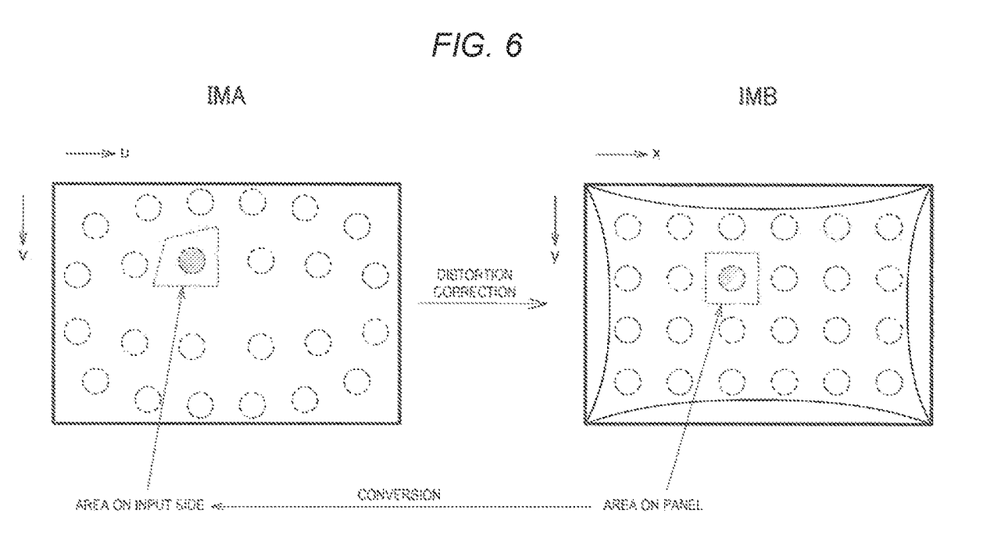
FIG. 6 shows an example in which an area illuminated by a light source on a display panel is set as light source position information.

FIG. 6 shows an example in which an area illuminated by the light source on the display panel is set as the light source position information. The position information acquisition circuit 160 sets an area on the display panel corresponding to the faulty light source as the panel-side light source position information. For example, when the area is a rectangular area, coordinates corresponding to four vertexes of the rectangular area or coordinates of each pixel included in the rectangular area serve as the panel-side light source position information. The position information acquisition circuit 160 obtains an area of the input image data IMA corresponding to an area on the display panel by converting those coordinates on the display panel into coordinates of the input image data IMA. The area of the input image data IMA serves as the input-side light source position information.

In the present embodiment described above, the coordinate information for identifying the area corresponding to the faulty light source among the plurality of areas is input as the panel-side light source position information to the position information acquisition circuit 160. The position information acquisition circuit 160 executes the inverse distortion correction of the distortion correction on the coordinate information to obtain the input-side light source position information.

According to the present embodiment, the area on the display panel 340 corresponding to the faulty light source is converted into the area of the input image data IMA by the inverse distortion correction. Accordingly, the coordinate information for identifying the area corresponding to the faulty light source of the input image data IMA is output as the input-side light source position information to the host.

In the example in FIG. 6, the area corresponding to the faulty light source is a rectangular area. The coordinate information for identifying the area indicates coordinates corresponding to four vertexes of the rectangular area or coordinates of each pixel included in the rectangular area. However, the area corresponding to the faulty light source is not limited to the rectangular area. In the example in FIG. 3, the inverse distortion correction for the coordinate information for identifying an area corresponds to the coordinate conversion using the conversion table 167. However, the inverse distortion correction for the coordinate information for identifying the area may be coordinate conversion using any method as long as the position coordinates (x, y) on the display panel 340 can be converted into the position coordinates (u, v) of the input image data IMA.

Figure 7:
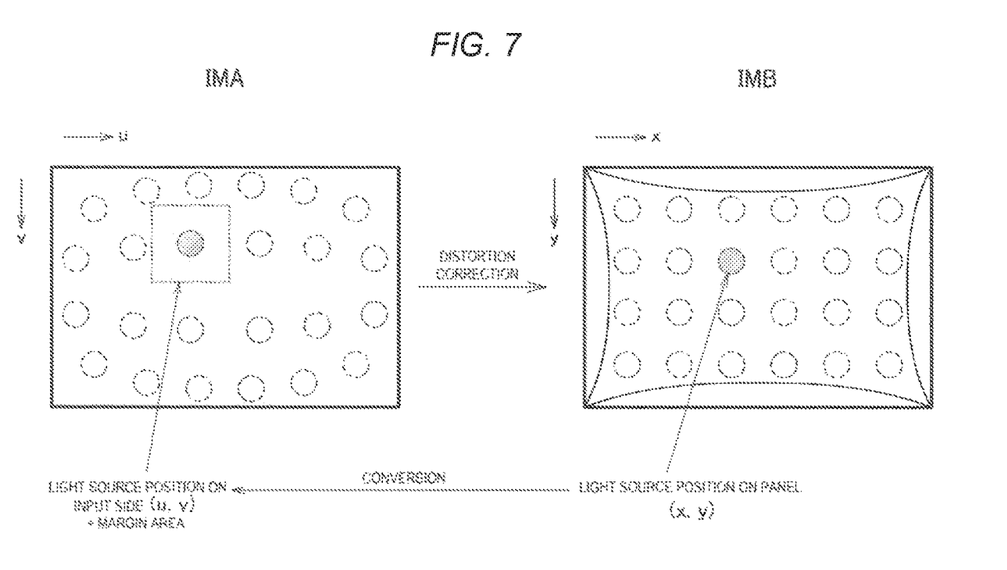
FIG. 7 shows an example in which a margin area of input image data is set as the light source position information.

FIG. 7 shows an example in which a margin area of the input image data IMA is set as the light source position information. The position information acquisition circuit 160 converts the center coordinates (x, y) of the faulty light source on the display panel into the coordinates (u, v) of the input image data IMA. The position information acquisition circuit 160 sets a margin area having a predetermined size around the obtained coordinates (u, v). The margin area serves as the input-side light source position information. For example, when the margin area is a rectangular area, coordinates corresponding to four vertexes of the rectangular area or coordinates of each pixel included in the rectangular area serve as the input-side light source position information.

Figure 8:
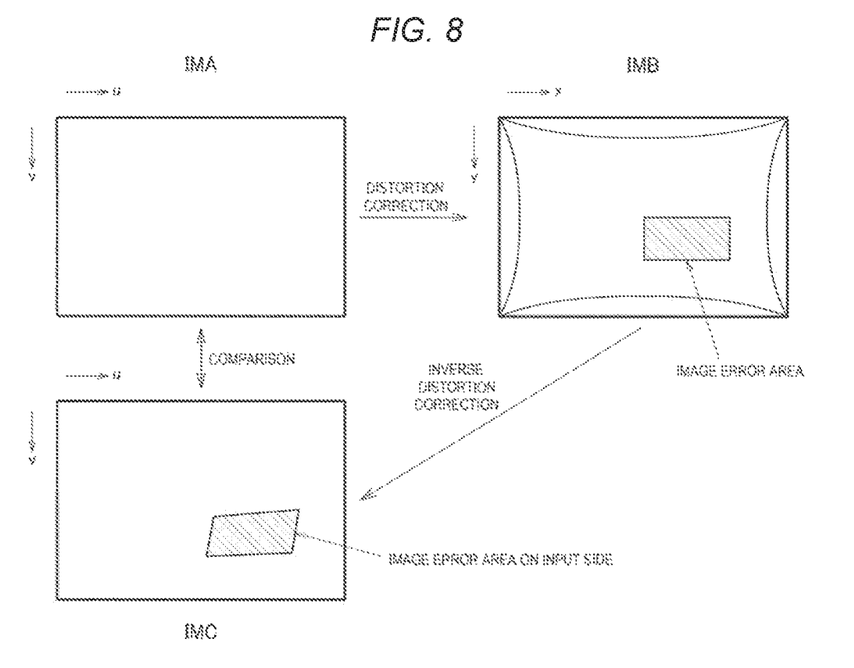
FIG. 8 is a diagram illustrating detection processing of a distortion correction error.

FIG. 8 is a diagram illustrating detection processing of a distortion correction error. As shown in an upper right section, it is assumed that an image error occurs partially in an area of the output image data IMB after the distortion correction. The image error is image data different from the output image data IMB when the distortion correction is normally processed. As shown in a lower left section, the inverse distortion correction circuit 120 executes the inverse distortion correction on the output image data IMB to obtain inverse-distortion-corrected image data IMC. The distortion correction error detection circuit 140 detects an image error area by comparing the input image data IMA with the inverse-distortion-corrected image data IMC. Since the image error area is mapped to an area on an input side by the inverse distortion correction, it is detected in which area the image error occurs on the input side. The image error area detected on the input side serves as the distortion correction error position information.

In the present embodiment described above, the circuit device 100 includes the inverse distortion correction circuit 120 and the distortion correction error detection circuit 140. The inverse distortion correction circuit 120 converts the output image data IMB into the inverse-distortion-corrected image data IMC by the inverse distortion correction of the distortion correction. The distortion correction error detection circuit 140 detects the distortion correction error by comparing the input image data IMA with the inverse-distortion-corrected image data IMC. The position information acquisition circuit 160 acquires distortion correction error position information, which is position information, on the input image data IMA, of an area in which the distortion correction error is detected. The host interface circuit 191 outputs the distortion correction error position information and the input-side light source position information to the host.

According to the present embodiment, when the image error occurs in the output image data IMB after the distortion correction, it is possible to detect the image error area of the input image data IMA corresponding to the image error area of the output image data IMB. The host can handle the distortion correction error by the distortion correction error position information indicating the image error area being transmitted to the host. Further, the host can execute appropriate handling according to a situation of various failures or image errors by the input-side light source position information and the distortion correction error position information of the faulty light source being transmitted to the host.

The circuit device according to the present embodiment described above is used in the display device. The display device includes the display panel and the backlight including the plurality of light sources. Each light source among the plurality of light sources is provided corresponding to a respective one of the plurality of areas of the display panel. The circuit device includes the distortion correction circuit, the failure information acquisition circuit, the position information acquisition circuit, and the host interface circuit. The distortion correction circuit executes the distortion correction on the input image data to output the output image data after the distortion correction. The failure information acquisition circuit acquires the failure information of the light sources. The position information acquisition circuit converts the panel-side light source position information, which is position information of the faulty light source indicated by the failure information on the display panel, into the input-side light source position information, which is position information of the faulty light source on the input image data. The host interface circuit outputs the input-side light source position information to the host.

According to the present embodiment, it is possible to notify the host of a defect in the backlight. Further, by converting the panel-side light source position information, which is position information of the faulty light source on the display panel, into the input-side light source position information, which is position information of the faulty light source on the input image data, it is possible to notify the host of the position information of the faulty light source in consideration of the mapping in the distortion correction. The host can execute processing of handling the light source failure on the input image data based on the position information.

In the present embodiment, the circuit device may include the light source interface circuit that performs the interface processing with the light source driver that drives the plurality of light sources. The failure information acquisition circuit may acquire the failure information via the light source interface circuit.

According to the present embodiment, the failure information acquisition circuit can acquire the failure information of the light sources detected by the light source driver via the light source interface circuit. The position information acquisition circuit can acquire the input-side light source position information of the faulty light source based on the failure information.

In the present embodiment, the position information acquisition circuit may receive the position coordinates of the faulty light source on the display panel as the panel-side light source position information and execute the inverse distortion correction of the distortion correction on the position coordinates to obtain the input-side light source position information.

According to the present embodiment, the position coordinates of the faulty light source on the display panel are converted into the position coordinates of the input image data by the inverse distortion correction. Accordingly, the position coordinates of the faulty light source of the input image data are output to the host as the input-side light source position information.

In the present embodiment, the position information acquisition circuit may receive the coordinate information for identifying the area corresponding to the faulty light source among the plurality of areas as the panel-side light source position information and execute the inverse distortion correction of the distortion correction on the coordinate information to obtain the input-side light source position information.

According to the present embodiment, the area on the display panel corresponding to the faulty light source is converted into the area of the input image data by the inverse distortion correction. Accordingly, the coordinate information for identifying the area corresponding to the faulty light source of the input image data is output to the host as the input-side light source position information.

In the present embodiment, the circuit device may include the storage circuit. The storage circuit may store a conversion table in which the position information of the light sources on the display panel is associated with the position information on the input image data. The position information acquisition circuit may convert the panel-side light source position information into the input-side light source position information based on the conversion table.

According to the present embodiment, the position information of the light sources on the display panel being associated with the position information on the input image data is stored in the storage circuit as the conversion table in advance, and the position information of the faulty light source on the display panel can be converted into the position information of the faulty light source on the input image data using the conversion table.

In the present embodiment, the failure information acquisition circuit may acquire, as the failure information, at least one of the open circuit information and the short circuit information of the light emitting element of each light source.

According to the present embodiment, the input-side light source position information of the faulty light source, and the information indicating whether a failure of the faulty light source is the open circuit or the short circuit of the light emitting element are transmitted to the host. Accordingly, the host can execute handling according to a type of the failure.

In the present embodiment, the circuit device may include the inverse distortion correction circuit and the distortion correction error detection circuit. The inverse distortion correction circuit may convert the output image data into the inverse-distortion-corrected image data by the inverse distortion correction of the distortion correction. The distortion correction error detection circuit may detect the distortion correction error by comparing the input image data with the inverse-distortion-corrected image data. The position information acquisition circuit may acquire distortion correction error position information, which is position information, on the input image data, of an area in which the distortion correction error is detected. The host interface circuit may output the distortion correction error position information and the input-side light source position information to the host.

According to the present embodiment, when the image error occurs in the output image data after the distortion correction, it is possible to detect an image error area of the input image data corresponding to an image error area of the output image data. The host can execute the appropriate handling according to the situation of the various failures or image errors by the input-side light source position information and the distortion correction error position information of the faulty light source being transmitted to the host.

The head-up display apparatus according to the present embodiment includes any one of the circuit devices described above, the display panel that displays an image based on the output image data, the backlight, and the projection optical system that projects an image displayed on the display panel.

Although the present embodiment has been described in detail as described above, it will be readily apparent to those skilled in the art that many modifications may be made without departing substantially from novel matters and effects according to the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. Further, all combinations of the present embodiment and the modifications are also included in the scope of the present disclosure. Further, configurations, operations, and the like of the circuit device, the display unit, the processing device, the display device, and the head-up display apparatus are not limited to those described in the present embodiment, and various modifications can be made.

What is claimed is:

1. A circuit device used in a display device that includes a display panel and a backlight including a plurality of light sources and in which each light source among the plurality of light sources is provided corresponding to a respective one of a plurality of areas of the display panel, the circuit device comprising:
   a distortion correction circuit configured to execute distortion correction on input image data to output output image data after the distortion correction;
   a failure information acquisition circuit configured to acquire failure information of the plurality of light sources;
   a position information acquisition circuit configured to convert panel-side light source position information, which is position information of a faulty light source indicated by the failure information on the display panel, into input-side light source position information, which is position information of the faulty light source on the input image data; and
   a host interface circuit configured to output the input-side light source position information to a host,
   wherein the panel-side light source position information corresponds to the position information of the faulty light source of the plurality of light sources of the backlight, and the plurality of light sources is two-dimensionally arranged as a matrix arrangement or a staggered arrangement in a plan view, and
   the position information acquisition circuit receives a two-dimensional position coordinate of the faulty light source on the display panel as the panel-side light source position information and executes inverse distortion correction of the distortion correction on the position coordinate to obtain the input-side light source position information.

2. The circuit device according to claim 1, further comprising:
   a light source interface circuit configured to perform interface processing with a light source driver configured to drive the plurality of light sources, wherein
   the failure information acquisition circuit acquires the failure information via the light source interface circuit.

3. The circuit device according to claim 1, wherein
the position information acquisition circuit receives coordinate information of the two-dimensional position coordinate of the faulty light source for identifying an area corresponding to the faulty light source among the plurality of areas as the panel-side light source position information and executes inverse distortion correction of the distortion correction on the coordinate information to obtain the input-side light source position information.

4. The circuit device according to claim 1, further comprising:
a storage circuit configured to store a conversion table in which position information of the plurality of light sources on the display panel is associated with position information on the input image data, wherein
the position information acquisition circuit converts the panel-side light source position information into the input-side light source position information based on the conversion table.

5. The circuit device according to claim 1, wherein
the failure information acquisition circuit acquires, as the failure information, at least one of open circuit information and short circuit information of a light emitting element of each of the plurality of light sources.

6. The circuit device according to claim 1, further comprising:
an inverse distortion correction circuit configured to convert the output image data into inverse-distortion-corrected image data by inverse distortion correction of the distortion correction; and
a distortion correction error detection circuit configured to detect a distortion correction error by comparing the input image data with the inverse-distortion-corrected image data, wherein
the position information acquisition circuit acquires distortion correction error position information, which is position information, on the input image data, of an area in which the distortion correction error is detected, and
the host interface circuit outputs the distortion correction error position information and the input-side light source position information to the host.

7. A head-up display apparatus comprising:
the circuit device according to claim 1;
the display panel configured to display an image based on the output image data;
the backlight; and
a projection optical system configured to project the image displayed on the display panel.

* * * * *